US009888313B2

(12) United States Patent
Ushakov

(10) Patent No.: US 9,888,313 B2
(45) Date of Patent: Feb. 6, 2018

(54) WEARABLE MODULAR TELECOMMUNICATION DEVICE

(71) Applicant: Alexey Leonidovich Ushakov, Moscow (RU)

(72) Inventor: Alexey Leonidovich Ushakov, Moscow (RU)

( * ) Notice: Subject to any disclaimer, the term of this patent is extended or adjusted under 35 U.S.C. 154(b) by 0 days.

(21) Appl. No.: 15/701,827

(22) Filed: Sep. 12, 2017

(65) Prior Publication Data

US 2018/0014110 A1 Jan. 11, 2018

Related U.S. Application Data

(63) Continuation-in-part of application No. 15/168,012, filed on May 28, 2016, which is a continuation-in-part of application No. 15/052,240, filed on Feb. 24, 2016, now Pat. No. 9,621,978, which is a continuation of application No. 13/902,903, filed on May 27, 2013, now Pat. No. 9,282,392.

(30) Foreign Application Priority Data

Dec. 28, 2012 (RU) ................................ 2012158157

(51) Int. Cl.
*H04R 1/10* (2006.01)
*H04M 1/05* (2006.01)
*H04M 1/15* (2006.01)
*H04R 1/08* (2006.01)

(52) U.S. Cl.
CPC ............ *H04R 1/1066* (2013.01); *H04M 1/05* (2013.01); *H04M 1/15* (2013.01); *H04R 1/08* (2013.01); *H04R 1/105* (2013.01); *H04R 1/1033* (2013.01); *H04R 1/1041* (2013.01); *H04R 2201/023* (2013.01)

(58) Field of Classification Search
CPC .. H04R 1/1041; H04R 1/1033; H04R 1/1066; H04R 1/105; H04R 1/08; H04R 2201/023; H04M 1/05; H04M 1/15
USPC .......................................................... 381/74
See application file for complete search history.

(56) References Cited

U.S. PATENT DOCUMENTS

2011/0216931 A1* 9/2011 Bui ..................... H04R 1/1091
381/333

* cited by examiner

Primary Examiner — Paul S Kim
(74) Attorney, Agent, or Firm — Bardmesser Law Group

(57) ABSTRACT

Wearable electronic device includes a neck loop worn on a neck with two electromechanical units; two in-ear earphones; two earphone cords. Each unit has an earphone cord winding mechanism including (i) a spool for winding the earphone cord; (ii) a double drive mechanism including an electric motor, a reducer, and a spiral spring; (iii) an engagement mechanism for engagement between the drive mechanism and the spool; and (iv) a lock mechanism. One unit has a motor control key for the electric motor and the lock mechanism. One end of the cords is connected to one of the earphones and the other end to one of the spools. The units are mechanically connected to each other to prevent twisting, and to the neck loop so that one of the units is on the left side of the chest, and the other electromechanical unit is on the right side of the chest.

21 Claims, 16 Drawing Sheets

WEARABLE MODULAR TELECOMMUNICATION DEVICE

CROSS-REFERENCE TO RELATED APPLICATIONS

This application is a continuation in part of U.S. patent application Ser. No. 15/168,012, filed on May 28, 2016 (docket no. 2785.0010002, entitled WEARABLE TELECOMMUNICATION DEVICE IN A FORM OF A NECKLACE) which is a continuation in part of U.S. patent application Ser. No. 15/052,240, filed on Feb. 24, 2016 (docket no. 2785.0030000, entitled HEADSET FOR A MOBILE ELECTRONIC DEVICE, now U.S. Pat. No. 9,621,978) which is a continuation of U.S. patent application Ser. No. 13/902,903, filed on May 27, 2013 (entitled HEADSET FOR A MOBILE ELECTRONIC DEVICE, now U.S. Pat. No. 9,282,392), which claims priority to Russian Patent Application No. 2012158157, filed on Dec. 28, 2012, all of which are incorporated by reference herein in their entirety.

FIELD OF THE INVENTION

The invention relates to telecommunication devices, more particularly, to a wearable modular telecommunication device in a form of a neckband.

BACKGROUND OF THE INVENTION

Wearable telecommunication devices based on a necklace, collar, neckband, headband or any similar load-carrying structure are often used as an interface between a human being and a technical system, which may be a telecommunication system, a computer system, an entertainment system, a medical system, a security system, etc.

In order to make interaction with a wearable device comfortable, its form-factor has to be as ergonomic as possible, i.e., it has to correspond to human anatomical characteristics, and it should not stand out against the user's body when the user is wearing the device. Wearable devices of small thickness tend to have a rather big surface area adjacent to the user's body, in order to provide enough space to accommodate their components; this requires the devices to be flexible in those portions which are adjacent to the human body, for replicating, without bristling, all bends occurring in complex kinematics chains of the human body in motion.

One way of making these devices comfortable for users and barely visible for people around the users, is to wear the devices under clothes. However, in this case, it may be difficult to control them using keys or buttons without looking at them. In addition, erroneous actions of keys or buttons of an accessory must be avoided. These erroneous actions may occur due to movement of the user's trunk and limbs, accidental pressing by a belt of a bag hanging over a shoulder, or by a seat belt in a car. Further, it is desirable to avoid twisting a device located on the user's body, which may impede pressing a necessary button moved out of the area of tactile sensing.

The present invention is aimed at providing a modular electronic communication device wearable on the user's body, having control means easily accessible for the user, while being protected against accidental pressing thereof, and not hindering the user's movements, and which is barely visible for people around the users.

The invention is also aimed at solving a technical problem of winding earphone cords and parking earphones in a non-operational position of the earphones.

Known stereo headsets in a form of a necklace, a collar, or a neckband, either of a half-loop or closed loop type, do not solve these tasks entirely.

A known headphone, earphone or earbud system (US20140037102 A1) includes a device for retracting cords, fixed on a lanyard or a necklace. These cords are connected to the rear part of the necklace and may be wound when the headphones are in a non-operational position. The device for retracting cords includes two stacked retraction mechanisms; main drawback of this solution is great thickness of the device disposed on the user's dorsal surface, which may impede motion of the user's head and neck. Details of the retraction mechanisms are not described; in particular, principle of locking the cord coils is not disclosed.

There is a known earphone holding structure (US20130208407 A1) for retracting a headphone cord and for securing a headphone when it is in a non-operational position, wherein the holding structure is positioned inside an electronic apparatus. The earphone holding structure is supposed to be embedded in a portable device like a tabled computer and is too massive for using in wearable devices.

There is a known headset (US2008143954 A1), (US20110051982 A1) in a form of spectacles comprising headphones to be secured to the spectacle frame when the headphones are in a non-operational position, and connected by separate cords to an electronic unit located on the user's occiput. The headset has a considerable weight and the electronic unit observably extends from the user's head surface. This makes wearing the headset visible to others and inconvenient.

There is a device (US20110130174 A1) for retracting and winding a headphone cord. Headphones are connected to an electronic apparatus by separate cords, and the device is positioned on the surface of the apparatus, which may be placed in a pocket or fastened to a belt, etc. This makes wearing the headphone noticeable and inconvenient. The device does not have any controls means.

There is a known wearable modular interface strap device (U.S. Pat. No. 7,618,260 B2) for supporting multiple units. In some embodiments the strap device is arranged as a necklace. However, this device does not address the earphone placement problem, nor provides blind control of the device through clothes.

All headsets in a form of a neckband available on the market are intended to be worn over clothes; the problem of nesting or placement of headphones and their cords, when the headsets are in a non-operational position, is not addressed by those headsets.

In a Bluetooth neckband-like headset Samsung Gear Circle, headphones are fixed on the neckband by magnets, when the headset is in a non-operational position, but this fixation is not reliable and the headphones tend to come loose from the neckband, and catch on clothes and surrounding objects.

The problem of positioning (parking) headphones and their cords, when the headsets are in a non-operational position, is partially solved in a Bluetooth headset LG Tone Infinim. This device is equipped with a retraction mechanism based on a spiral spring for retracting headphones. However, the spiral spring is not powerful enough to drive a cord coil, as energy of the spiral spring is insufficient for overcoming the friction force between the cord and a cord guide; moreover, the spring force is unstable, and it is minimal in the end of the winding process, when the traction is maximal; therefore, winding a long cord is not guaranteed.

A possible solution to this problem may be through the use of an electric motor. However, taking into account size of a device wearable under clothes, using an electric motor may also be insufficient. Even with electric motors having the best torque/size ratiom like Faulhaber 0816P006SR having a speed of 16000 rpm and a reducer gear 1/16, 1/32 or 1/64, the retracting force may still be insufficient. Using a greater reduction ratio makes the winding time unacceptably long. This may be why motor-based cord winding mechanisms are rare in patent literature.

If a headphone cord is positioned over the user's auricle in an operational position and the cord path inside a retracting device makes the cord even longer, total length of a wound portion of the cord may be 33 cm or more. Meanwhile, in headsets like LG Tone Infinim equipped with a retraction mechanism, total length of winded portion of the cord is not greater than 23 cm. An additional drawback of this device is that two buttons have to be pressed to wind the cords. The buttons are located on both sides of the device, so the user has to use both hands to wind the cord at once or wind the cords alternately.

Therefore, there is a need for providing control of winding two cords by one button, with synchronous unlocking two coils.

Thus far, no wearable telecommunication device suitable for constant wearing has been designed. The device of the present invention provides improved user experience through easy use, reliable fixation thereof on the user's body, and preventing failures caused by the cords catching on surrounding objects. Moreover, this device shall have a suitable cord retraction mechanism. Additionally, parking headphones and their cords, when the headset is in a non-operational position, is reliable, easy and comfortable for the user.

SUMMARY OF THE INVENTION

Accordingly, the present invention is directed to a wearable electronic device comprising earphones, that substantially obviates one or more of the disadvantages of the related art. The wearable modular device includes earphones; it prevents substantial change of the user's appearance while wearing thereof; it assures convenient use without restricting freedom of the user's movements and may be effectively controlled directly through the user's clothes.

These and other advantages are ensured by a wearable electronic device comprising a neck loop configured to be worn around a user's neck and including two electromechanical units. The device also includes an electrical connector on the neck loop, two in-ear earphones, and two cords. One end of each of the cords is connected to one of the earphones and the other end is connected to the electrical connector, wherein the cords are also mechanically connected to the neck loop close to each other. The electromechanical units are mechanically connected to the neck loop so as to prevent twist of the electromechanical units and to ensure that one of the electromechanical units is positioned on the left side of the user's chest, and the other electromechanical unit is positioned on the right side of the user's chest. At least one of the electromechanical units includes a control key and has a substantially flat shell with at least three narrow facets, wherein two of the narrow facets are adjacent to each other and substantially perpendicular to the user's body surface, when the telecommunication device is worn by the user. The press surface of the control key is disposed at an angle of 60 to 90 degrees relative to the user's body surface, close to a border between the two adjacent narrow facets, and the third narrow facet is at least partially opposed to the press surface of the control key.

In an embodiment of the device, at least one of the two cords includes an attachment disposed on the cord at a distance of 13 cm or less from a point of connection between the cord and the neck loop. The attachment may be configured to join the cords together and to slide along the cords. The attachment may further include an additional control key and/or a microphone.

In an embodiment of the device, the neck loop may be U-shaped or O-shaped.

In an embodiment of the device, the electromechanical units may include recesses to receive the earphones, and may be equipped with latched lids; the electromechanical unit may include at least one button configured to open at least one of the lids.

An embodiment of the device may further include a head-mounted display in a form of glasses connected to the neck loop by a cord, wherein the in-ear earphones may be connected to the head-mounted display.

In an embodiment of the device, the neck loop and at least one of the electromechanical units may be configured to adjust the neck loop length by arranging an excess portion of the neck loop inside the electromechanical unit.

In an embodiment of the device, the flat shell of the electromechanical unit may be polyhedron-shaped. Any polyhedron-shaped flat shell may include at least one curvilinear convex surface.

The above-stated and other advantages are also achieved by a wearable electronic device comprising a neck loop configured to be worn on the user's neck and including two electromechanical units. The device also includes two in-ear earphones and two earphone cords. Each electromechanical unit has an earphone cord winding mechanism including a spool for winding the earphone cord, a double drive mechanism including an electric motor, a reducer, and a spiral spring. The earphone cord winding mechanism also includes an engagement mechanism for ensuring engagement between the double drive mechanism and the spool and a lock mechanism for locking and unlocking rotation of the spool. At least one of the electromechanical units may include a motor control key for controlling the electric motor and the lock mechanism. One end of each of the cords is connected to one of the earphones and the other end is connected to one of the spools. The electromechanical units are mechanically connected to each other so as to prevent twist of the electromechanical units, and mechanically connected to the neck loop so as to ensure that one of the electromechanical units is positioned on the left side of the user's chest, and the other electromechanical unit is positioned on the right side of the user's chest.

In an embodiment of the device, the engagement mechanism may include a floating pinion and a pulling solenoid for moving the floating pinion so as to ensure engagement between the drive mechanism and the spool.

In an embodiment of the device, the lock mechanism may include a ratchet mechanism and a ratchet control mechanism. The ratchet mechanism may be configured to avoid unintentional winding the earphone cord and the ratchet control mechanism may be configured to deactivate the ratchet mechanism, when the electric motor is activated.

An embodiment of the device may further include at least two Bowden cables, at least one guide unit, and at least one slider attached to the earphone cords between the earphones and the guide unit. The guide unit may be fixed on the neck loop by the Bowden cables between the electromechanical units, and may be positioned on the dorsal surface of the user's neck. The earphone cords may be movably positioned inside the Bowden cables. The slider may be configured to move along the earphone cords so that a distance between the slider and the guide unit is 13 cm or less. Weight of the guide unit is less than total weight of the electromechanical units.

In an embodiment of the device, the slider may be fixable on the earphone cords and may be connected to the guide unit by a soft sleeve, wherein the earphone cords may be inside the soft sleeve. At least one of the earphone cords may include a bulge between the corresponding electromechanical unit and the slider so as to limit movement of the slider along the earphone cords without impeding movement of the earphone cords inside the guide unit and the Bowden cables.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, and together with the description serve to explain the principles of the invention.

DETAILED DESCRIPTION OF EMBODIMENTS OF THE INVENTION

Figure 1:
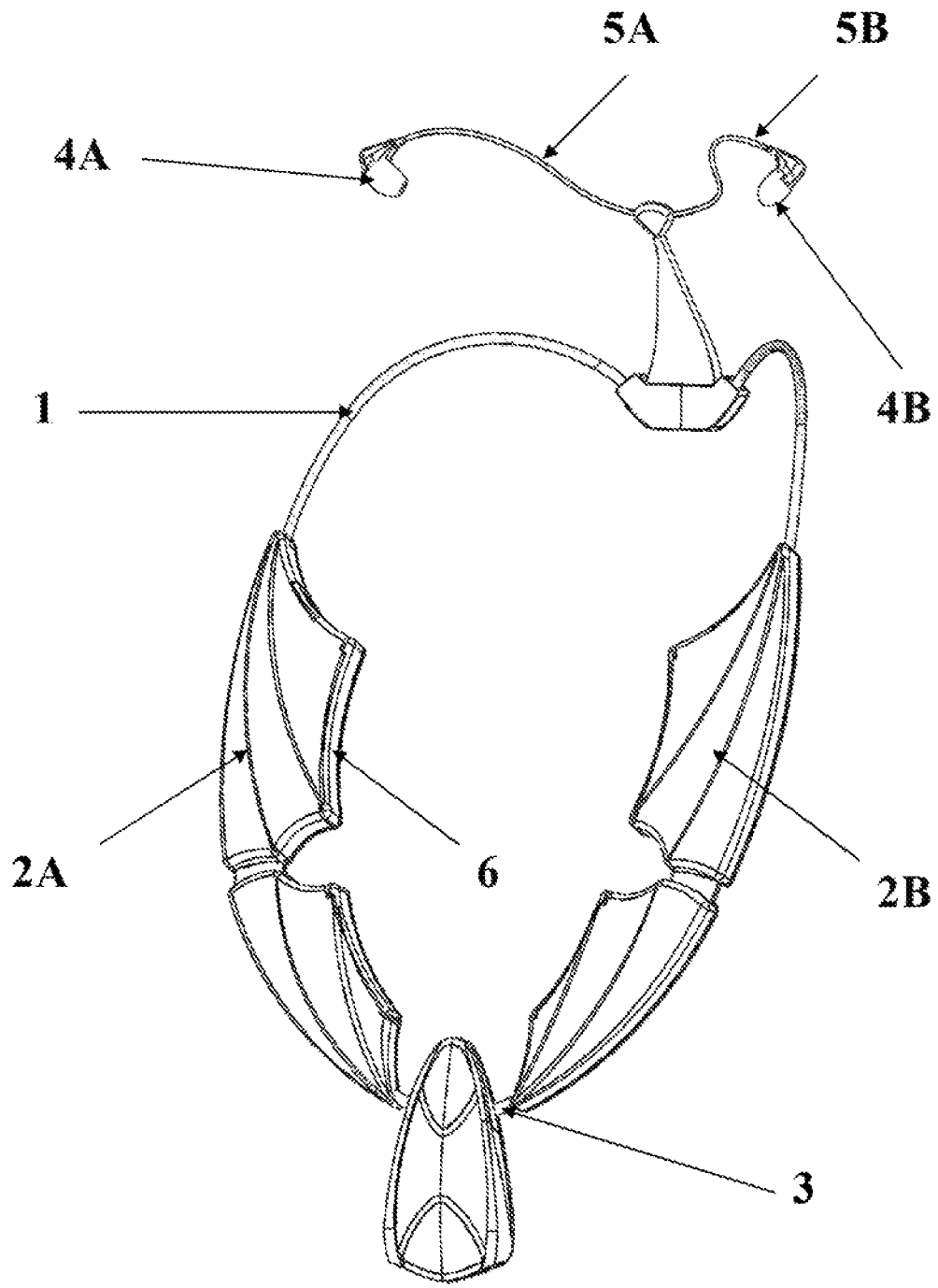
FIG. 1, FIG. 2 and FIG. 3 show a general view of a wearable modular device according to the invention, having rigid flat members.

Reference will now be made in detail to the preferred embodiments of the present invention, examples of which are illustrated in the accompanying drawings.

A wearable telecommunication device in a form of a neck loop or a half-neck loop (neckband) is proposed. The device is intended for wearing under clothes and its main control means are configured to be manipulated through clothes with no need of seeing thereof. Unintentional pressing the control means is prevented by design; while the control means are easily accessible for the user, so there is no need to pull the neckband from under the clothes. The neckband includes parking spots or nesting recesses for components of the device like wired earphones, so these components may be firmly secured to the neckband for parking or nesting and may be invisible in a non-operational position; however, these components (e.g., earphones) may be readily taken from under clothes.

The above-stated problem is solved by special layout of the control means relative to the user's body, taking into account types of the clothes. The control means are disposed on the neckband so as to ensure "blind control", in particular, they may be located in rigid members provided in a form of a substantially flat polyhedron, wherein the control means (e.g., buttons) are disposed on a narrow facet of the polyhedron close to a border between two adjacent narrow facets, and press surface of the control key is disposed at an angle of 60 to 90 degrees relative to the user's body surface. Parking spots or nesting recesses for the wired earphones are located on the neckband and equipped with holding means for the earphones and optionally for the cords.

A wearable telecommunication device (FIG. 1, FIG. 2) includes a neck loop 1 configured to be worn around a user's neck. The neck loop 1 includes two electromechanical units 2A and 2B. The device also includes an electrical connector 3 on the neck loop, two in-ear earphones 4A and 4B, two cords 5A and 5B, one end of each of the cords being connected to one of the earphones and the other end being connected to the electrical connector. The cords are also mechanically connected to the neck loop 1 close to each other. The electromechanical units are mechanically connected to the neck loop so as to prevent twisting of the electromechanical units and to ensure that the electromechanical unit 2A is positioned on the right side of the user's chest, and the electromechanical unit 2B is positioned on the left side of the user's chest.

At least one of the electromechanical units includes a control key 6 and has a substantially flat shell having at least three narrow facets, wherein two of the narrow facets are adjacent to each other and are substantially perpendicular to the user's body surface, when the telecommunication device is worn by the user.

The press surface of the control key 6 is disposed at an angle of 60 to 90 degrees relative to the user's body surface, close to a border between the two adjacent narrow facets, and the third narrow facet is at least partially opposed to the press surface of the control key 6, thus providing a rest for a finger of the user, when pressing the control key.

Figure 2:
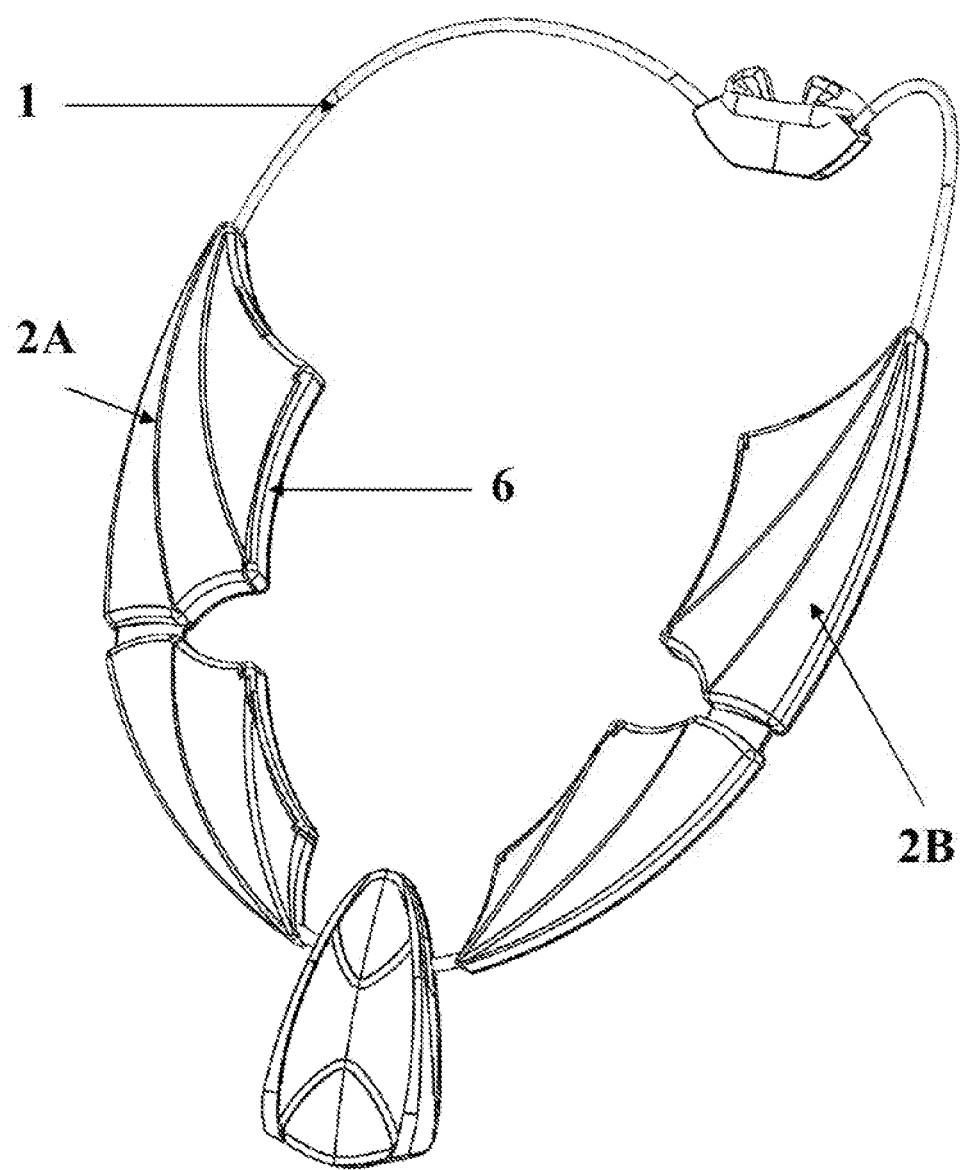

FIG. 1 shows a general view of a wearable device in an operational position of the earphones. FIG. 2 illustrates a wearable device in a non-operational position of the earphones, wherein the earphones are parked or nested at the corresponding parking spots or nesting recesses.

When the earphones are in a non-operational position, the following additional tasks shall be addressed:
  securing the earphones and, partly, the earphone cords on the neck loop in a non-operational (parked or nested) position;
  preventing a mesh of the earphone cords, when the earphones are being transitioned from an operational position to a non-operational position thereof;

providing possibility of fast and easy taking and placing at least one earphone in the ear, when an urgent incoming or outgoing call occurs;

providing enough length of the earphone cords for free rotating and tilting the user's head when earphones are in use;

addressing all the above tasks when the device is worn under clothes;

providing possibility of tactile contact with the control means, and preventing unintentional activating thereof, when the device is worn under clothes;

In order to address the above tasks, the following solutions are provided:

earphones are in-ear earphones, wherein the cord connected to the earphone is forming a kind of an arm or bail, which allows using the earphone with the cord either located over the auricle or positioned in the lower part of the auricle;

additional holding means for earphones like holders, latches or locks are provided on the neck loop;

the control means are designed to facilitate tactile finding the control means and activating thereof through clothes; in other words, the user has to find a button or key located under clothes with no visual contact with them, while unintentional pressing thereof by a safety belt or a knapsack strap, etc., is prevented.

The above-indicated task may be solved by a device comprising functional (e.g., electromechanical) units. A functional unit may be provided in a form of a flat polyhedron, where the surfaces of two narrow facets are substantially parallel to each other and substantially perpendicular to the user's body surface. The unit includes a control button or key positioned on a facet near a corner, where said facet borders another facet being perpendicular to the user's body surface. The button or key is configured to be easily found and pressed through the user's clothes, when the device is worn under the clothes. The described configuration prevents unintentional pressing buttons or keys, whereas intentional pressing is possible by catching and holding the unit with two fingers.

In an alternative embodiment, the unit may be provided in a form of a substantially polyhedron-shaped flat shell, wherein parallel and perpendicular positions relate to corresponding tangent planes of the unit surface. The polyhedron-shaped flat shell may include a curvilinear convex surface.

Further embodiments of a wearable electronic communication device intended for wearing under clothes, e.g., in a form of a neck loop or a half-loop are described. The most ergonomic solution is disposing a button interface in a region having a form of an isosceles triangle having horizontal base located between proximal ends of clavicle and the vertex directed downwards in the vicinity of xiphisternum in men and somewhat higher than that in women. The reach of hands in this case is based on particularities of the user's clothes, when considering a male dressed in standard European clothes not only in warm but also in cold climate. This layout of the buttons allows managing the electronic device with no pulling it from under the clothes, by pressing buttons or keys which are easily addressable by touch through the standard clothes. The buttons or keys are substantially unmovable and projected to substantially the same spot of the user's body, and they are tactually distinguishable from each other and able to provide a feedback in a form of a tactile or sound response (a click) upon pressing thereof.

Figure 3:
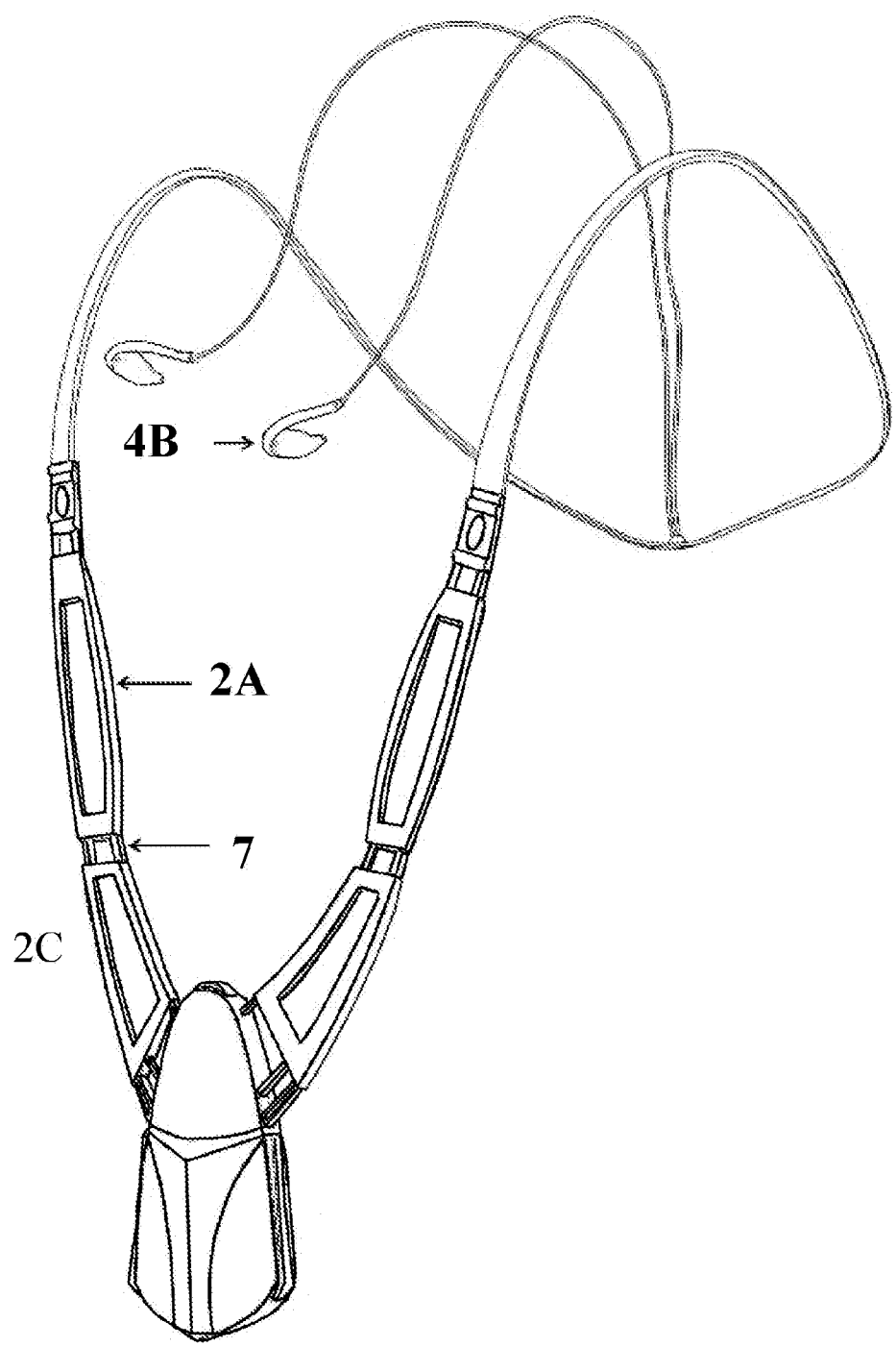

FIG. 3 shows an embodiment of a wearable device provided in a form of a loop, wherein the wearable device includes units 2A and 2C connected to each other by pairs of cables 7 comprising wires. This type of design is stipulated by the following requirements applicable to constantly wearable accessories suitable for wearing under clothes:

(1) the wearable device should be flexible enough in order to fit the user's body shape;

(2) the push buttons and the spots for parking or recesses for nesting the earphones should be located on the units;

(3) the wearable device should be stiff enough in order to avoid flipping over the buttons and the parking spots or nesting recesses located on the units;

(4) the buttons and the parking spots or nesting recesses should be disposed in readily accessible areas in order to assure comfortable access and effective control.

In order to provide enough flexibility, the cables with cords arranged inside the cables have to be flexible. A Bowden cable may be the best solution, as it may have magnetic properties. In order to improve reliability of electrical connections, the cords should have some excess length so as the tension force caused by bent of the cables do not affect considerably the soldering points of the cords. In order to reduce twist of parts of the wearable device during wearing thereof, cross-section dimension, optimal length and the number of the cables have to be determined.

Usually in wearable devices, the shells containing electronic functional devices are mounted directly on the cord, thus often causing twist of the cord, further causing the buttons being out of reach for the user's fingers.

The torsional strain concept for a sole cord connecting rigid members may be expressed by an equation characterizing torsional strain of a cylinder, which equation establishes a correspondence between the moment T of restoring force and the twist angle $\varphi$:

$$T = \varphi G J_0 / l, \tag{1}$$

where G is shear modulus; $J_0$ is geometrical polar moment of inertia; l is cord length. When considering the cylinder shape, $J_0 = \pi r4/2$, wherein r is the cylinder base radius. The equation (1) shows that a decrease in the length l and an increase in the cylinder radius r both increase the moment of forces impeding the twist. However, the increase in the cylinder radius, i.e., the cord gage in between the rigid members of the wearable device causes great discomfort while wearing thereof, so it is found expedient to shift from a circular wire to a flat wire disposed in parallel with the human body surface while wearing the wearable device. In this case, a model of a non-extendable tape shall be considered instead, since deformation of a tape occurs in a form of bending strain rather than shear strain.

Figure 4:
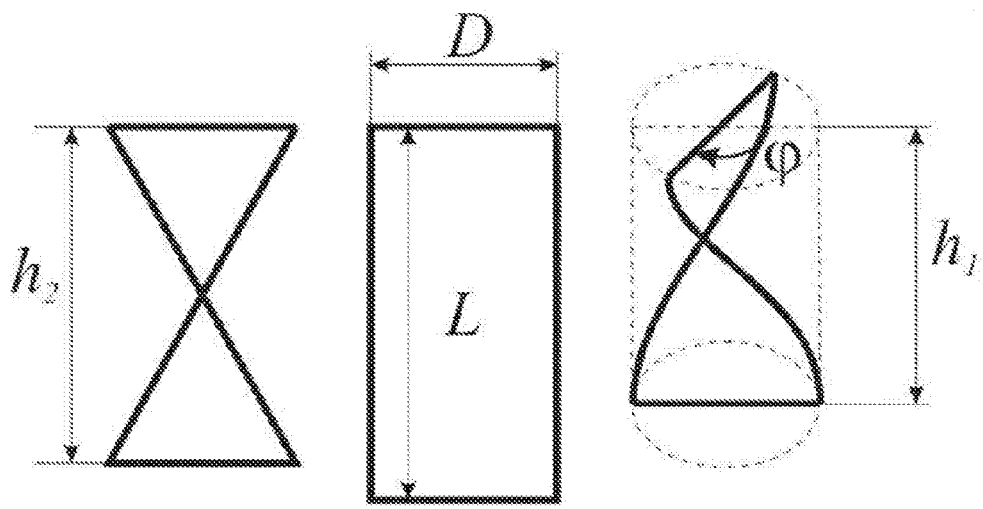
FIG. 4 illustrates change in form of flexible inextensible members of the wearable device according to the invention, occurring upon rotation thereof.

By using a flexible but non-extendable tape, additional rigidity in view of rotation of the rigid members relative to the longitudinal axis of the tape may be achieved, still retaining the tape flexibility in the cross-section thereof. As the tape material is non-extendable and incompressible, the length of the tape edges is not changed upon twisting the tape to the angle $\varphi$ and the tape edges are disposed along spiral geodesic curves on the surface of a cylinder circumscribed by the tape (FIG. 4). Thus, if the length L of the tape edges is constant, then the cylinder height is changed, which height $h_1$ may be determined based on the length of the geodesic curve on the cylinder surface:

$$h_1 = (L^2 - \varphi^2 D^2/4)^{1/2}. \tag{2}$$

Equation (2) shows that fixation of the geodesic curve length corresponding to inextensibility of the tape leads to a limitation of possible rotation angle, resulting from the following condition:

$$L^2 - \varphi^2 D^2/4 \geq 0. \quad (3)$$

Upon button flip-over, $\varphi = \pi$, then:

$$L^2 - \pi^2 D^2/4 \geq 0. \quad (4)$$

FIG. 4 shows examples of change in shape of flexible inextensible members upon twisting thereof. In the central part of FIG. 4, a flexible member having the length of L and the diameter of D is shown. A twisted tape is shown in the right part of this figure, and a pair of cables secured to the members is shown in the left part, wherein the planes of securing are rotated by 180° relative to each other.

If the length L and the diameter D are selected so that the inequality (4) is false, then flip-over of buttons is impossible due to non-extendibility of the tape, i.e., in order to prevent flip-over of buttons, it is required that the following condition is met:

$$L \leq \pi D/2. \quad (5)$$

If rigid members having width equal to D are connected with two cables having the edge length of L and disposed on the member sides, then rotation by 180° or $\pi$ radian causes crossing the cables and the height $h_2$ is determined to be $$h_2 = (L^2 - D^2)^{1/2}. \quad (6)$$

Correspondingly, the allowable length of the cables is determined to be $$L \leq D. \quad (7)$$

Therefore, in order to avoid flip-over of the rigid members, they should be connected by flexible inextensible members, or a tape or a Bowden cable, or a pair of cables having a length equal to or less than the member width.

Figure 5A:
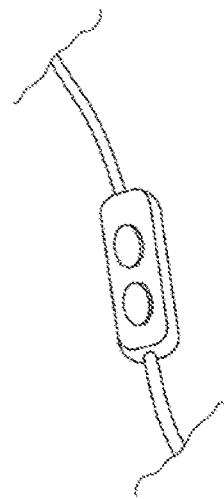
FIG. 5A, FIG. 5B, FIG. 5C, FIG. 5D, FIG. 6 and FIG. 7 show embodiments of an attachment disposed on the earphone cord.
Figure 5B:
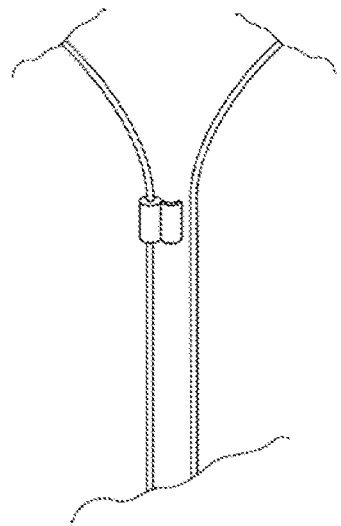
Figure 5C:
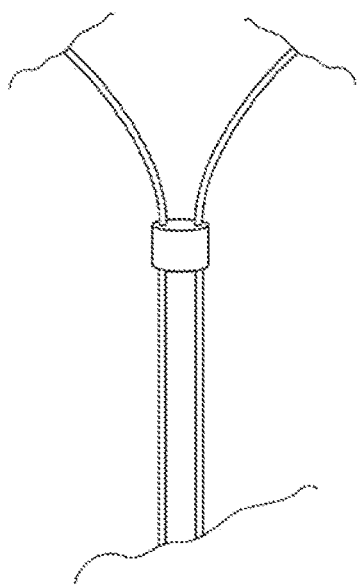

At least one of the two earphone cords may include an attachment disposed on the cord at a distance of 13 cm or less from a point of connection between the cord and the neck loop (FIGS. 5A to 5C).

Figure 5D:
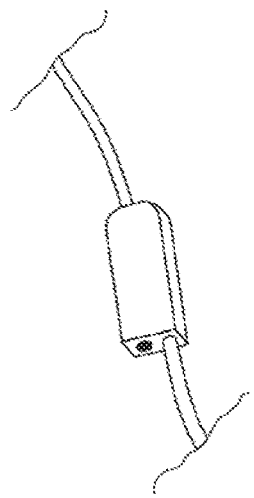

The attachment (FIG. 5A) may further include an additional control key. The attachment (FIG. 5B) may be configured to join the cords together. In some embodiments (FIG. 5C), the attachment may slide along the cords. Also, the attachment (FIG. 5D) may include an additional connector for pairing with wearable devices.

Figure 6:
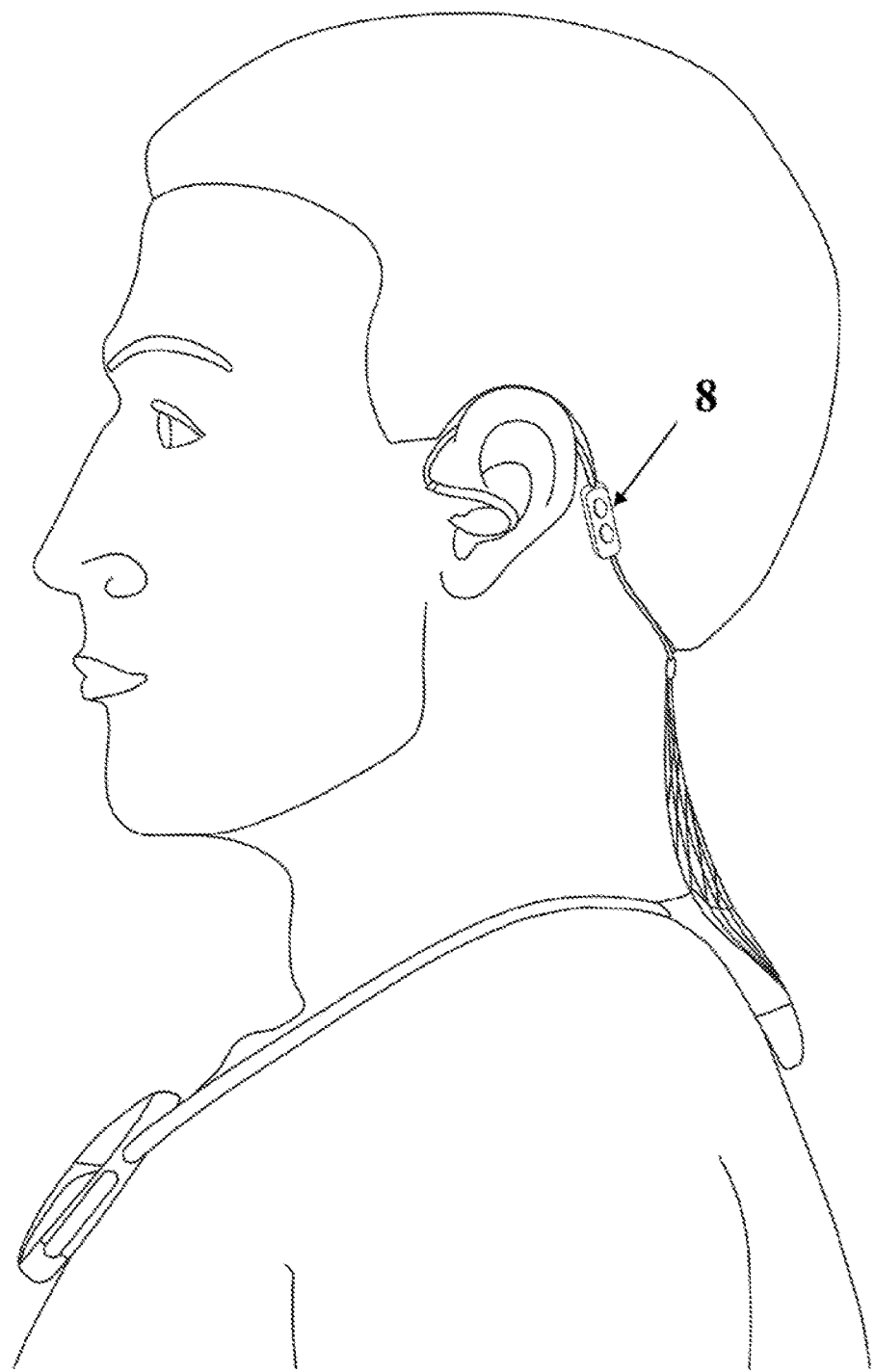
Figure 7:
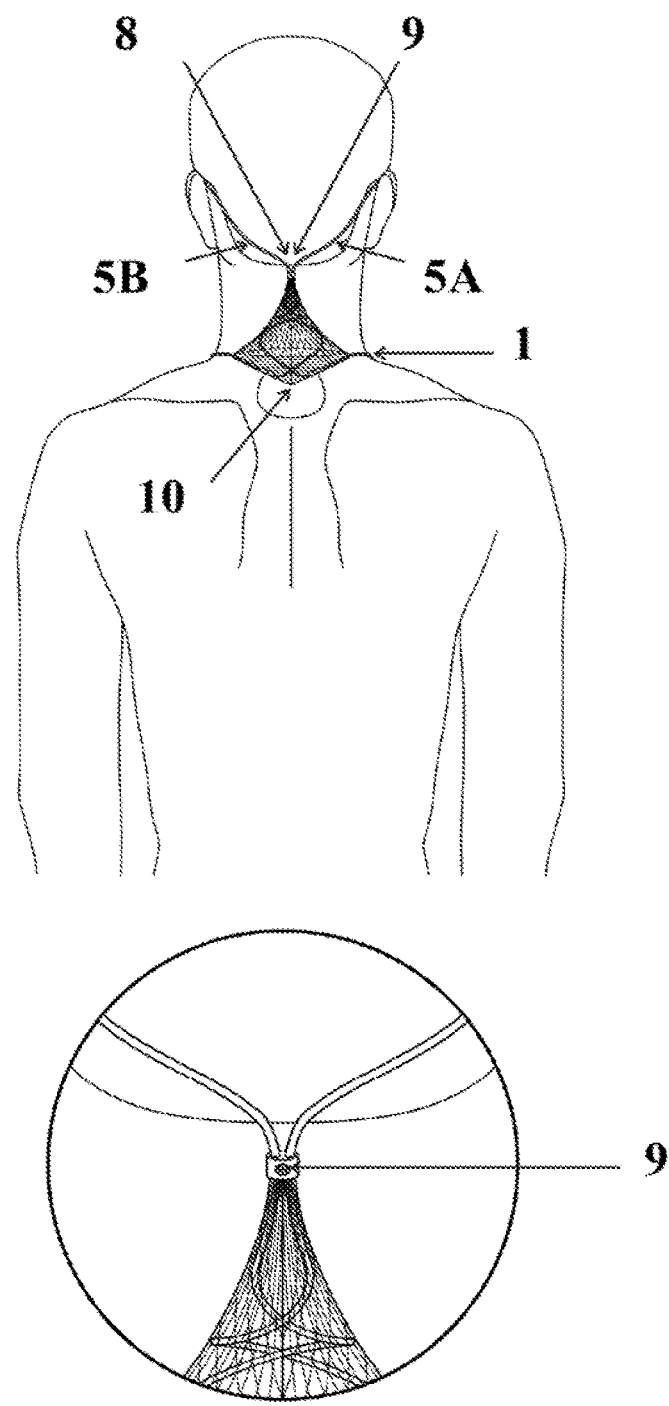

FIG. 6 and FIG. 7 show the attachment comprising a microphone.

In some embodiments, the attachment may be a clip, and the length of the cords may be adjusted by moving the clip along the cords.

In some embodiments, the form of the wearable device may vary from a half-loop to a completely closed loop. A range of intermediate options is also possible, like an O-shaped loop configured to open and thus to transform to an open loop or a U-shaped loop configured to close and thus to transform to a closed loop when in use.

Figure 8:
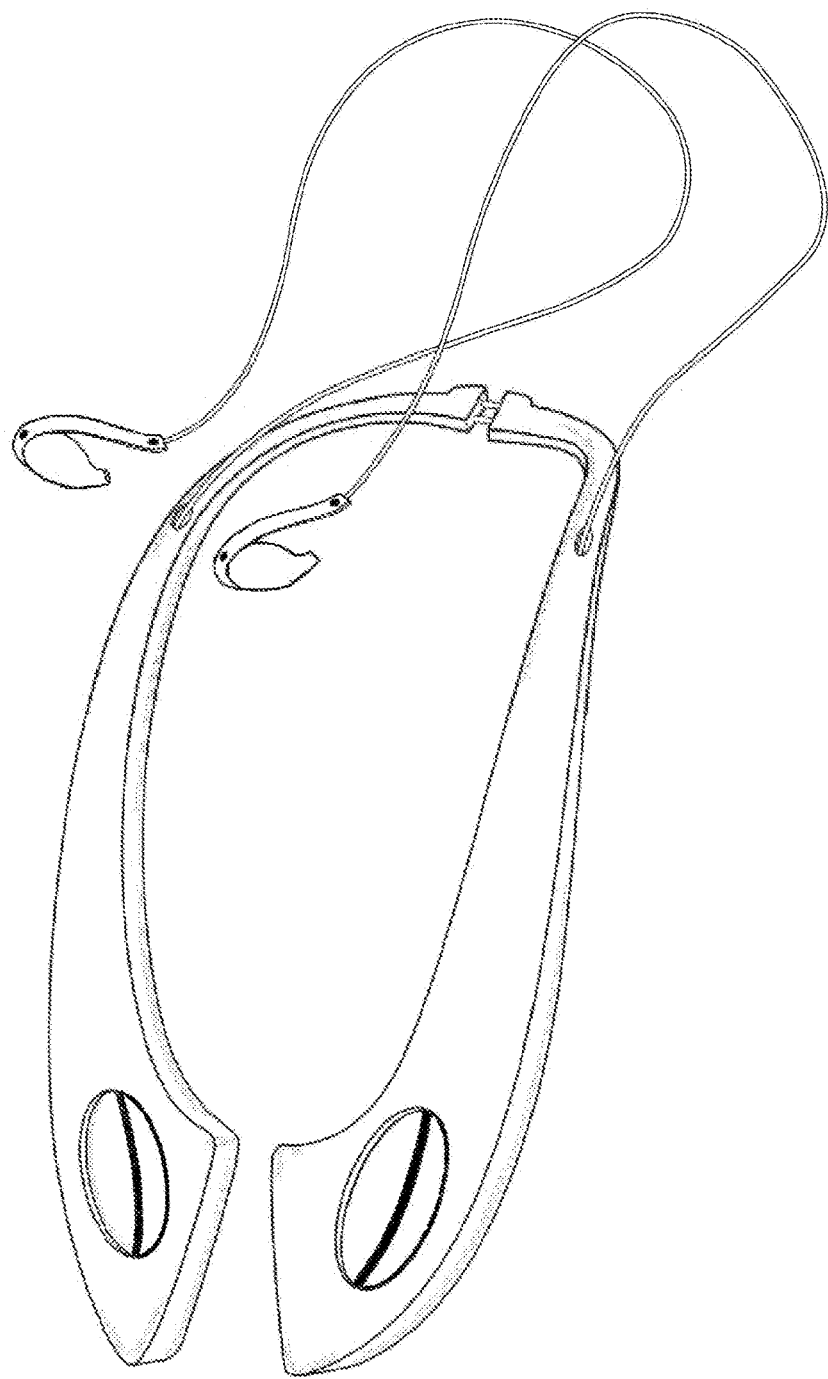
FIG. 8 is a general view of a wearable device according to the invention, with a U-shaped loop.

FIG. 8 shows an embodiment of a U-shaped necklace, where functional units may be placed on the chest at the left and right sides of the necklace. A functional unit may include a signal transceiver, such as Bluetooth, to receive signal from a cell phone; there may further be a battery, a player, a radio, an USB flash drive, an electronic key, a satellite signal receiver like GPS and/or GLONASS and/or GALILEO receiver able to tell coordinates through voice information transmitted directly to the user's earphones.

In some embodiments of the device, control buttons and keys may be disposed both in the units and on the neck loop.

All buttons may be located separately, at some distance from each other and two separate buttons may be operated by pressing on the different sides of a rocker arm.

Furthermore, pressure may be exerted with two fingers simultaneously, typically a thumb and a forefinger, on two opposite buttons located on both sides of the neck loop. This eliminates accidental pressure by a vehicle safety belt, a bag strap, etc. Such an arrangement of buttons provides maximum accessibility of the buttons, even when the user wears a tie, a suit or a coat.

Here, control means of the claimed device are mainly described as buttons or keys in examples and embodiments. However, other types of control means may be used depending on the functions controlled by these control means. In particular, buttons or keys may be used to turn on and off some functions of the device (answer a call, decline a call, play, pause, next track, previous track, etc.); scrolling wheels or sliders may be used to adjust some parameters in a continuous range (volume up and down, degree of noise suppression, etc.); pressure sensors (e.g., those of resistive, capacitive, ferroelectric or piezoelectric type, etc.) may be used instead of mechanical buttons or keys; pushbuttons may be integrated with scrolling wheels or sliders so as to provide combined control. In any way, the control means are configured in such a way that at least part of them may be easily activated through clothes of the user (mainly by pressing), providing fast and simple control of the device.

The following standard functions of the buttons or keys are preferably available: answering call (incoming call), voice command "call" (in absence of current connection), call end (at available connection), call drop (when receiving an incoming call), stop/continue (when listening), louder/quieter, switching tracks forward (when listening), voice recorder switch between external microphones and a telephone signal, switching tracks back, voice recorder switch off, rewind forward (when listening), voice reading SMS (at reception), rewind backward (when listening), write a voice answer to SMS (at reception), voice command (other than "call").

"Answering call" function may be allocated to a button disposed in one of the earphones, so upon answering a call, the earphone simultaneously may be fixed in the auricle. In order to avoid accidental pressing in other cases, this button may be involved only in an incoming call and may be ignored all the rest of the time (e.g., during a telephone conversation, while listening to music, in a "stand by" mode, etc.).

In some embodiments, the device may be free of cords delivering signal to the earphone and may have a power cord only; a cordless unit may be disposed in each earphone to receive and transmit electromagnetic signal for the earphone.

In some embodiments, one of the electromechanical units may include two nesting recesses, each of which is configured to receive one of the earphones and is equipped with a latched lid, and the electromechanical unit may include at least one button configured to open at least one of the lids.

Figure 9:
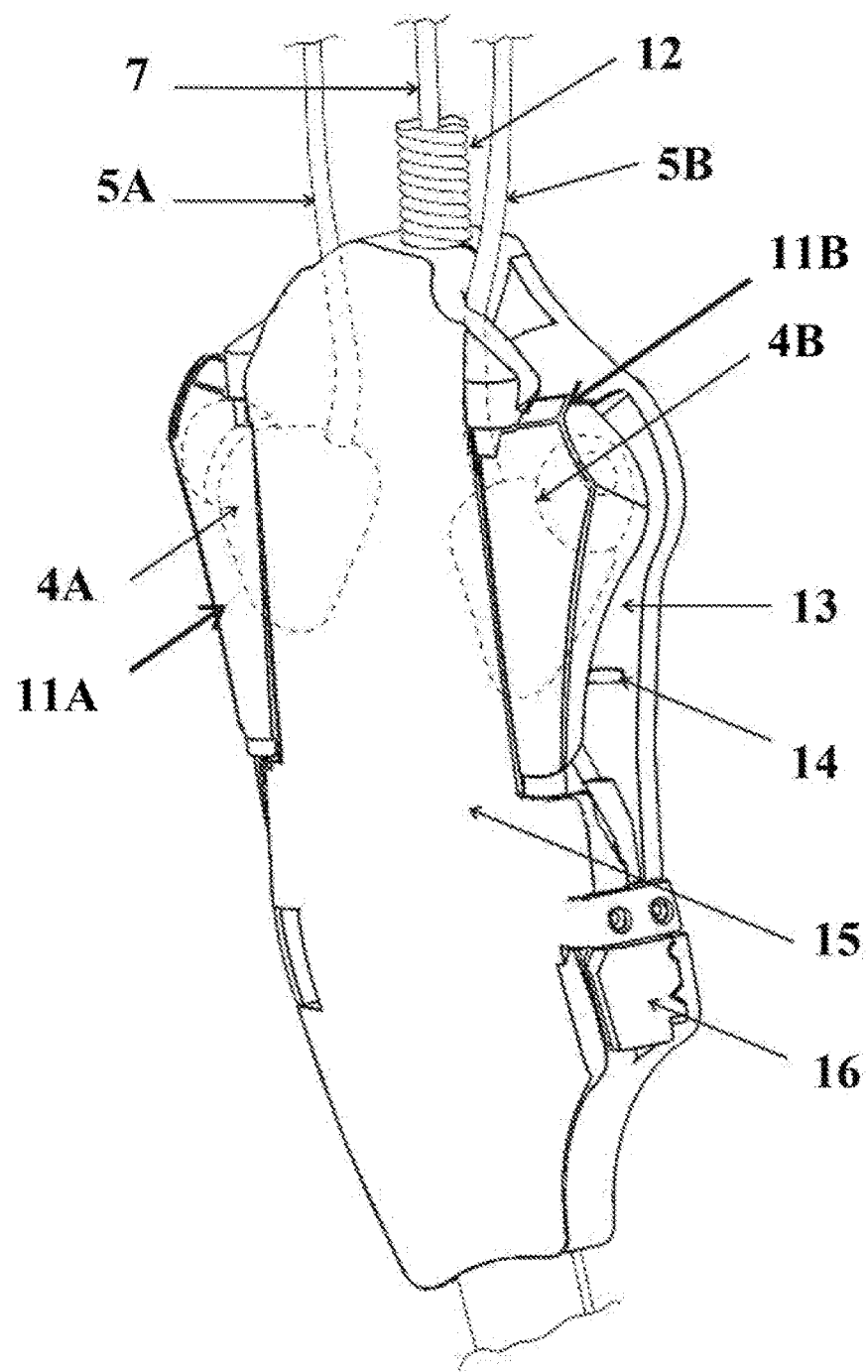
FIG. 9 and FIG. 10 illustrate an embodiment of an electromechanical unit comprising nesting recesses, showing its main functional components.
Figure 10:
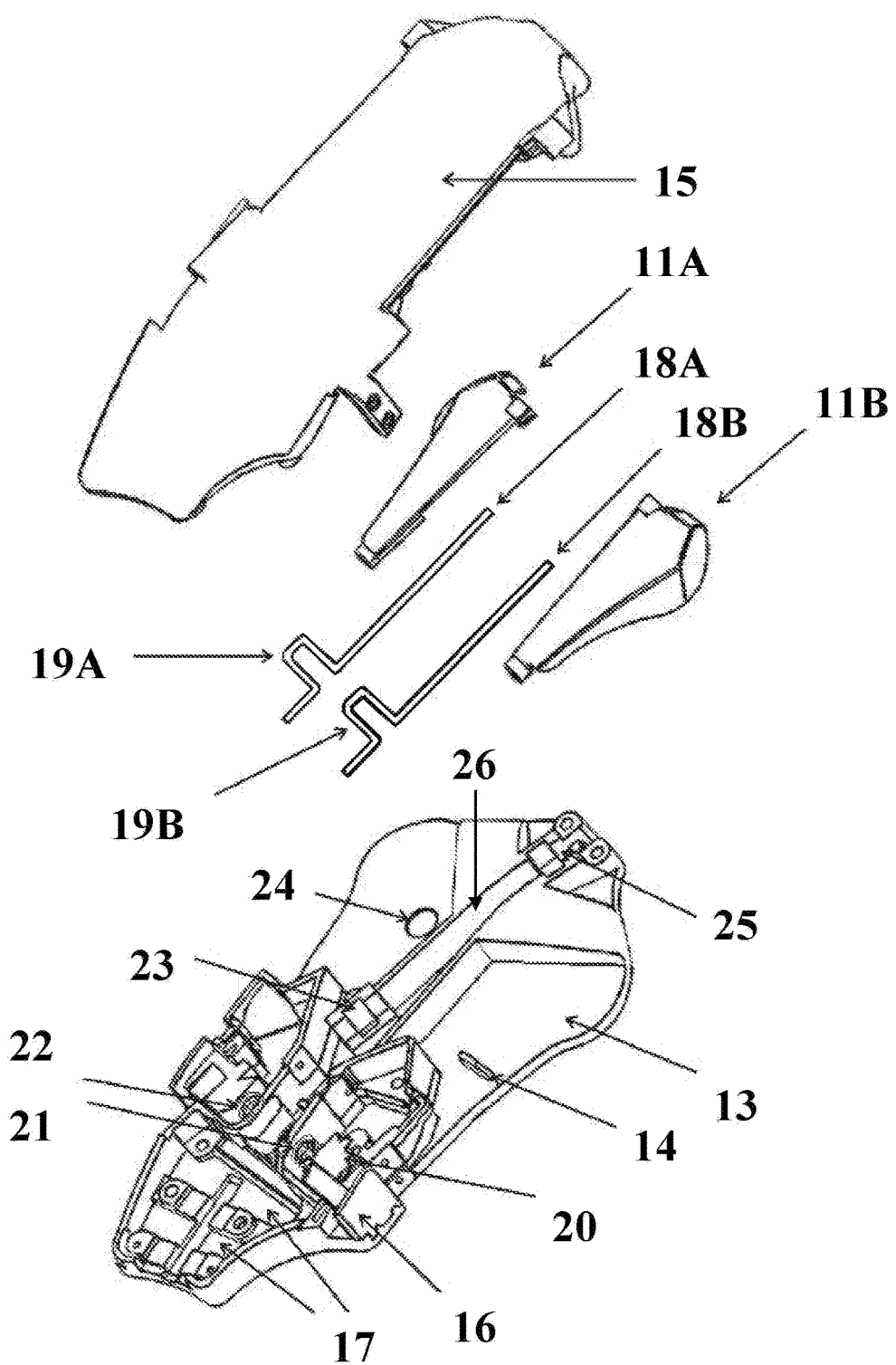

FIG. 9 and FIG. 10 show an embodiment of the device comprising two recesses, equipped with latched lids 11A, 11B.

It is expedient to equip each earphone with at least one permanent magnet, which is oriented to ensure that portions of the magnets protruding from the earphone shells correspond to the same magnet pole, while the opposite poles are buried in the earphone shells. Each nesting recess may contain a permanent magnet oriented opposite to the earphone magnets so as to ensure attracting the earphones to the recesses. Thus, the earphones in a non-operation position may be placed under clothes, e.g., they may be sank into a shirt-band and captured by one of the magnets 14, 24 located in one of the recesses. The recess may further be equipped with a latched lid 11A, 11B, which may be opened by pressing a button 16, so the earphones in a non-operation position may be secured inside the electromechanical unit.

Left and right lids 11A, 11B include spring-loaded pins 18A, 18B shaped so they include flags 19A, 19B. Upon closing the lid, the flag engages a resilient tab 20, whose one end is secured to the button 16, so the lid is locked in its closed position. Upon pressing the button 16, the tab 20 moves along with the button 16 and breaks engagement with the flag, so that the lid opens. Afterwards, the user may take the earphones by pulling the cords, and then close the lids.

Figure 11:
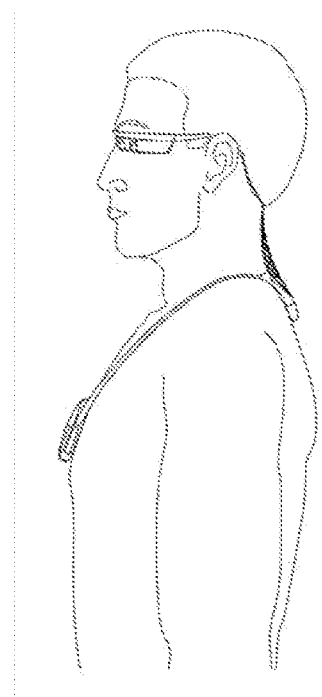
FIG. 11 and FIG. 12 show an embodiment of a wearable device comprising a head-mounted display.
Figure 12:
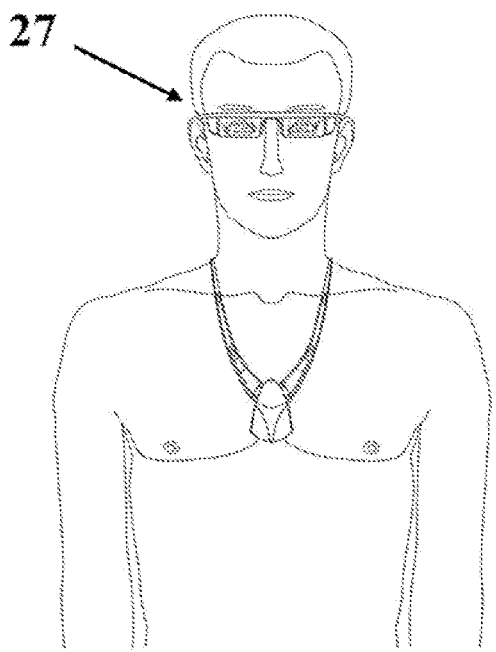

The wearable modular device may be a part of an integrated system (FIG. 11, FIG. 12), which includes, along with head-mounted display 27 and other body-worn mobile devices wirelessly connected to home or office computers, thus implementing permanent communications between themselves and an operator base; such a system may be called "cloud mobiling" by analogy with "cloud computing".

Figure 13:
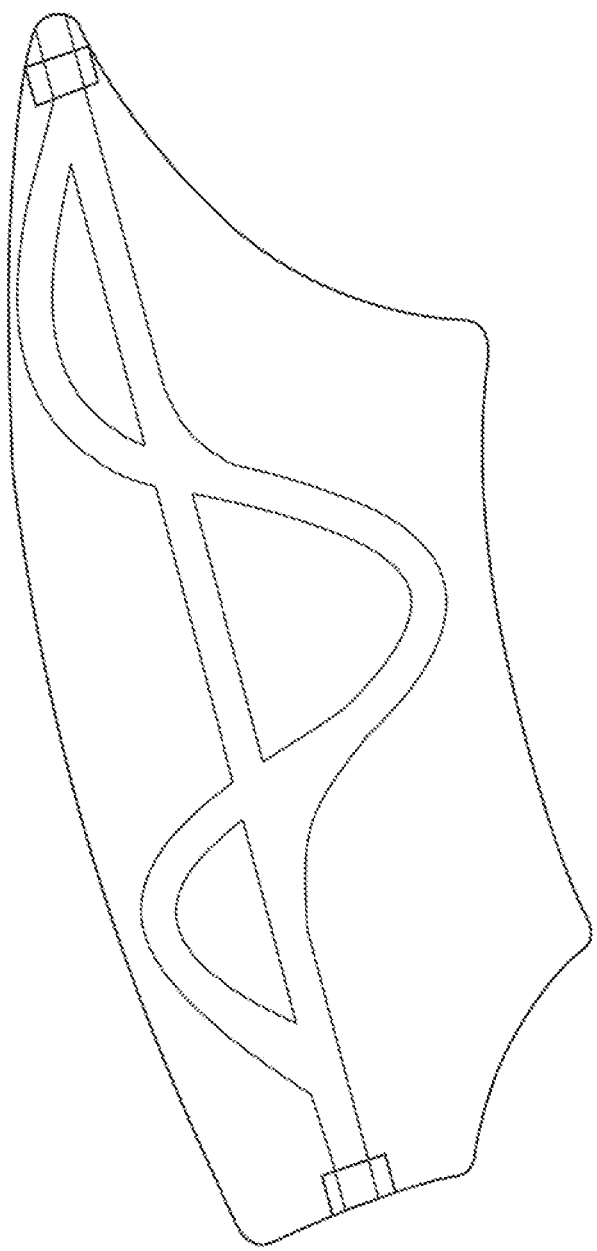
FIG. 13 shows a curved passage for adjustment of the neck loop length.

In some embodiments, some of the electromechanical units may include curved passages (FIG. 13) for adjusting the size of the neck loop by arranging an excess portion of the neck loop inside the electromechanical unit in the passage, as necessary for providing a better fit.

Figure 14:
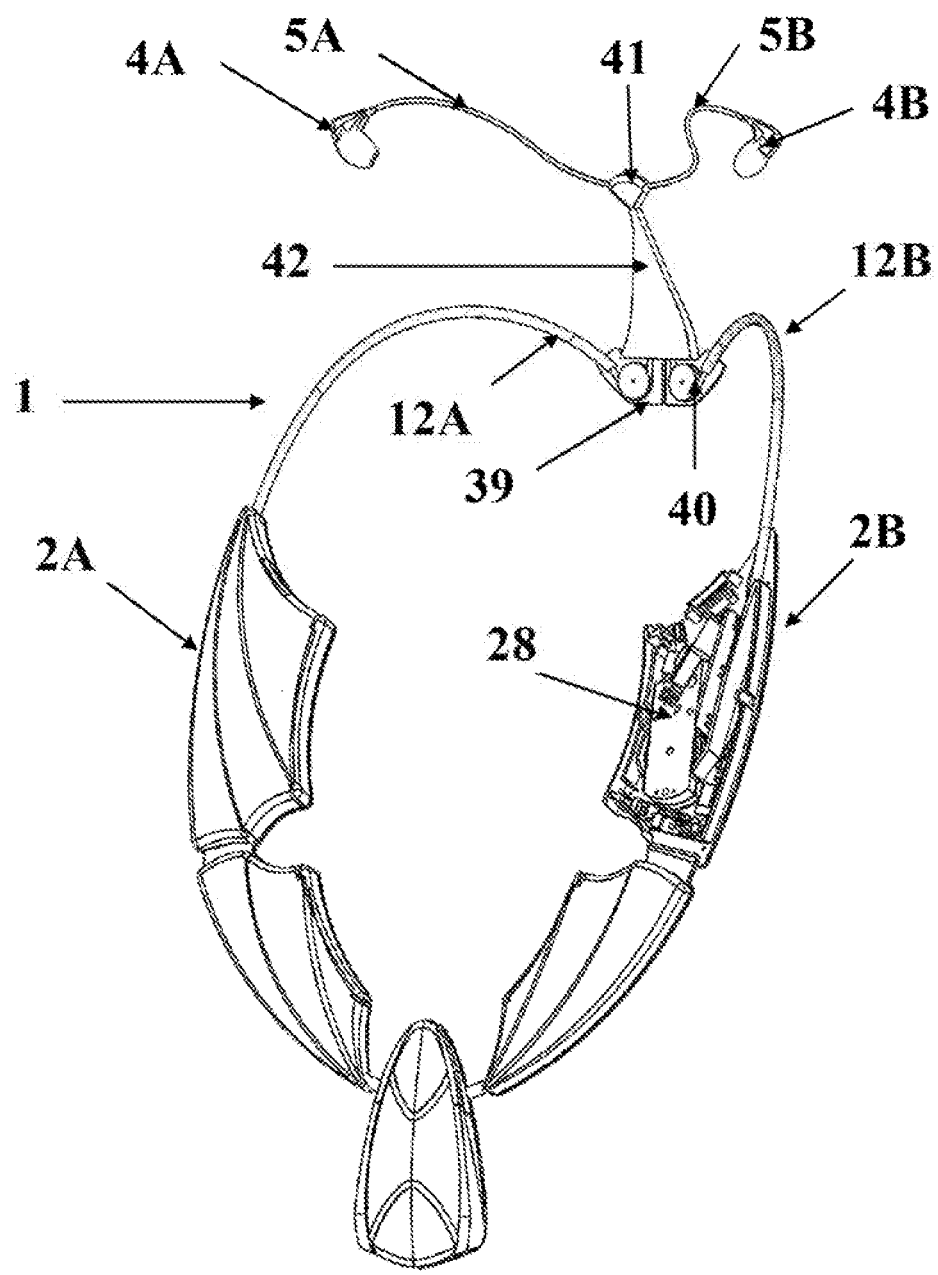
FIG. 14 shows a general view of a wearable device according to the invention, having an earphone cord winding mechanism.

A wearable telecommunication device (FIGS. 14, 15, 16) includes a neck loop 1 configured to be worn on a user's neck and includes two electromechanical units 2A and 2B. The device also includes two in-ear earphones 4A and 4B, two earphone cords 5A and 5B, wherein each electromechanical unit has an earphone cord winding mechanism 28 including a spool 29 for winding the earphone cord, a double drive mechanism including an electric motor 30, a reducer 31, and a spiral spring 32. The earphone cord winding mechanism 28 also includes an engagement mechanism 33 for ensuring engagement between the double drive mechanism and the spool 29; and a lock mechanism 34 for locking and unlocking rotation of the spool. At least one of the electromechanical units includes a motor control key 35 for controlling the electric motor and the lock mechanism. One end of each of the cords is connected to one of the earphones and the other end is connected to one of the spools, where the electromechanical units are mechanically connected to each other so as to prevent twist of the electromechanical units, and the electromechanical units are mechanically connected to the neck loop 1 so as to ensure that one of the electromechanical units is positioned on the left side of the user's chest, and the other electromechanical unit is positioned on the right side of the user's chest. When using an electric motor, a thin, soft and durable cord should preferably be used, e.g., a *Linum* cable having 6 Litz wires and an aramid thread inside.

Figure 15:
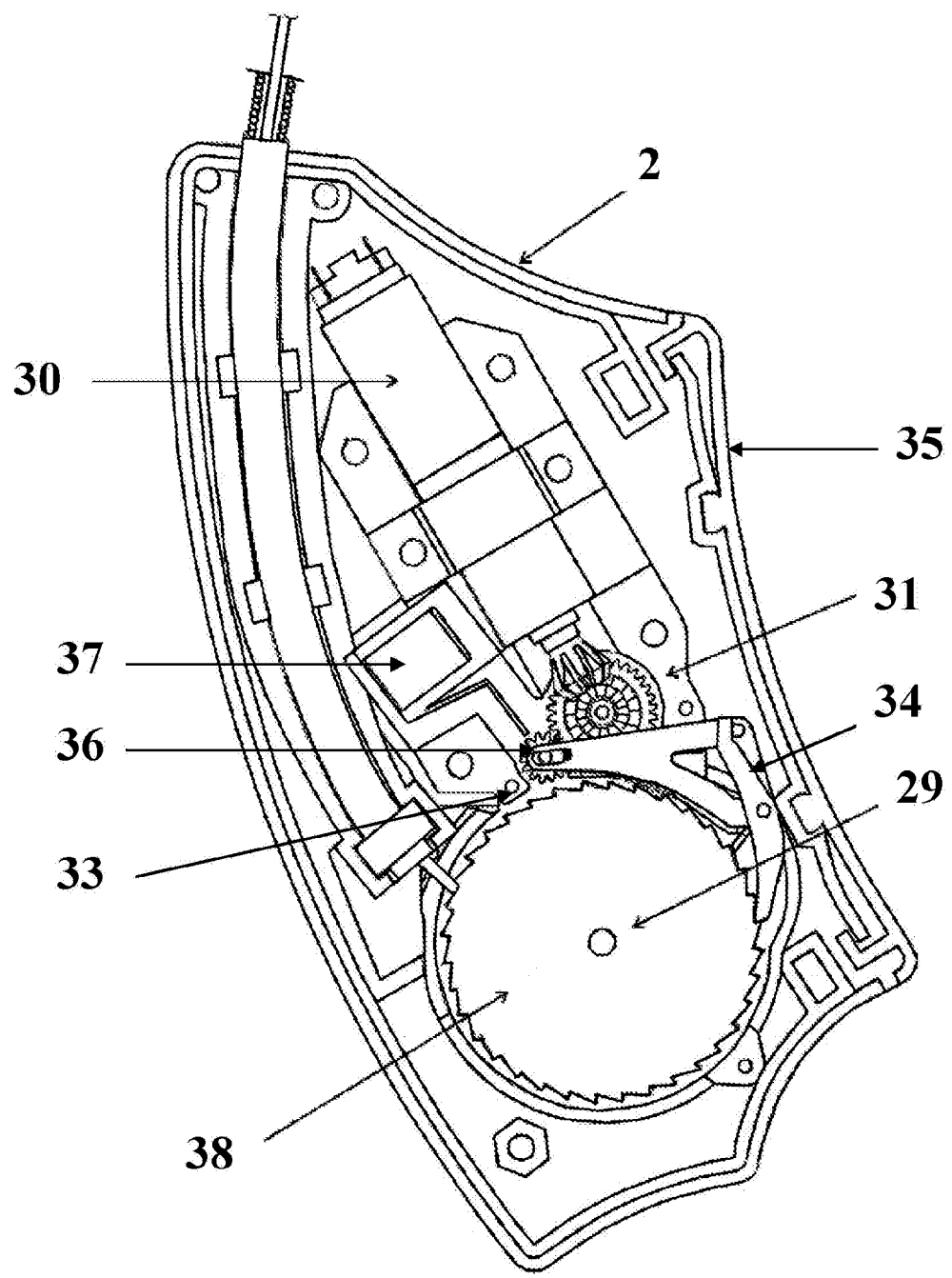
FIG. 15 and FIG. 16 show an embodiment of an earphone cord winding mechanism.
Figure 16:
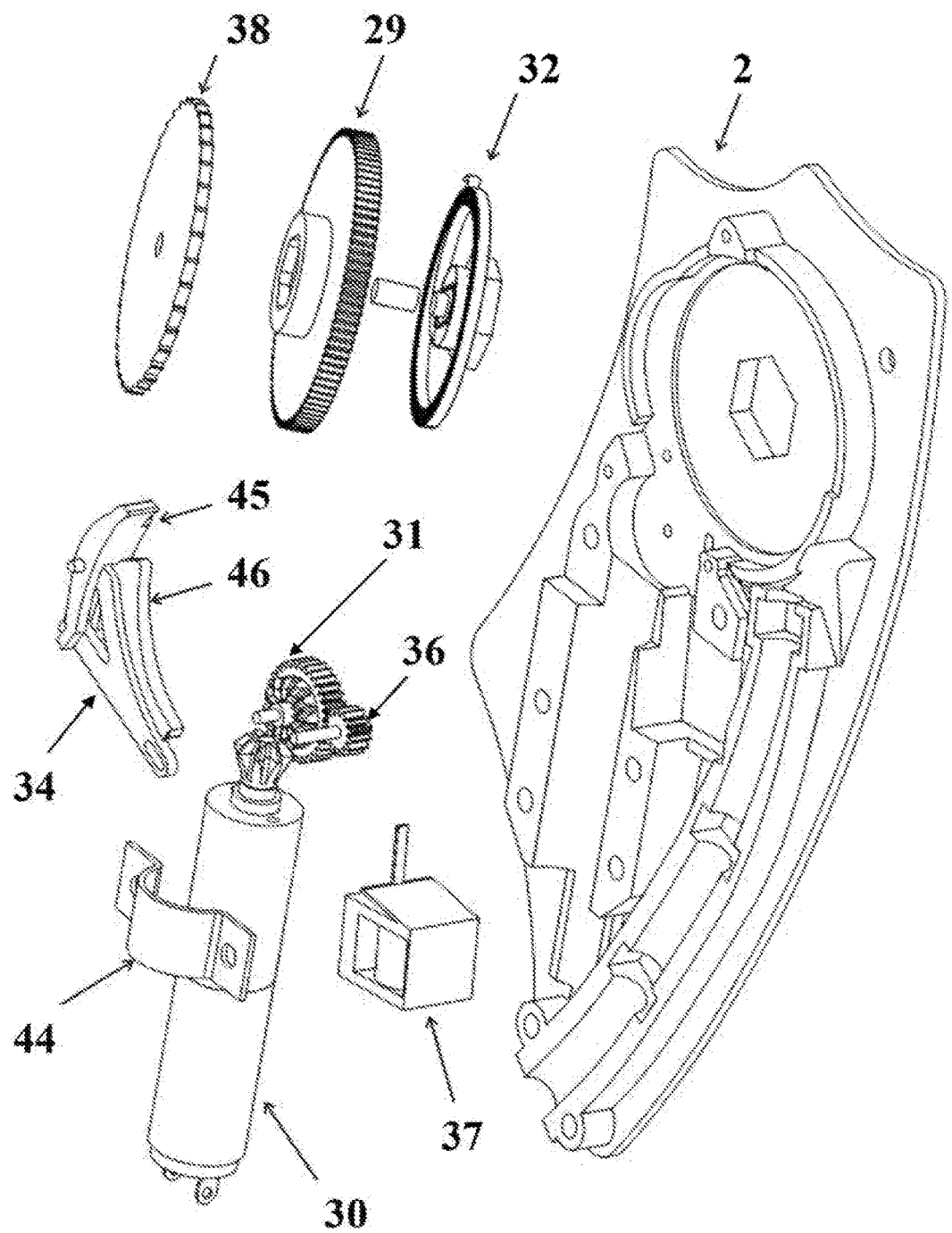

FIG. 15 and FIG. 16 show an arrangement of electromechanical unit with earphone cord winding mechanism. The engagement mechanism 33 may further include a floating pinion 36 and a pulling solenoid 37 for moving the floating pinion so as to ensure engagement between the drive mechanism and the spool.

In some embodiments, the lock mechanism 34 includes a ratchet mechanism and a ratchet control mechanism. The ratchet mechanism is configured to avoid unintentional winding the earphone cord and the ratchet control mechanism is configured to deactivate the ratchet mechanism, when the electric motor is activated.

The user presses button 35 located on the electromechanical unit in order to transfer the device to a non-operational position. This action activates the solenoid 37, which takes, by a pusher, the floating pinion 36 into engagement with pinions of the reducer 31 and the spool 29 for winding the cord. Simultaneously, the solenoid 37 unlocks a ratchet wheel 38 positioned on the axle of the spool 29. The ratchet wheel 38 is unlocked simultaneously with engagement of the floating pinion 36, as a catch 45 of the ratchet mechanism and the floating pinion 36 are connected to a rocker 46 opposite to each other. At the same time or immediately after that, the motor 30 is switched on and the cord is wound on the spool 29 until a controller commands to take the floating pinion 36 off the reducer 31 by retraction of the solenoid 37 or by short reverse of the motor 30, so the ratchet mechanism locks. Smooth rotation of the spool 29 at a rate necessary to provide winding time not greater than 5 seconds is additionally ensured by a flat spiral spring 32 located inside the spool shell. The spring 32 is wound up when the user pulls the cord and thus rotates the spool while transferring the device into an operational position thereof. The ratchet mechanism prevents voluntary unwinding the cord, and the spiral spring keeps the cord in somewhat tensioned condition in order to avoid whipping the cord during rotation of the spool.

In some embodiments, the device with an earphone cord winding mechanism (FIG. 14) may further include at least two Bowden cables 12A and 12B, at least one guide unit 39 with rollers 40 for checking cords when winding, and a slider 41 attached to the earphone cords between the earphones 4A, 4B and the guide unit 39. The guide unit 39 is fixed on the neck loop 1 by the Bowden cables between the electromechanical units 2A, 2B, and is located on the dorsal surface of the neck when worn by the user. The earphone cords may be movably positioned inside the Bowden cables. The slider 41 may be configured to move along the earphone cords so that a distance between the slider 41 and the guide unit 39 will be 13 cm or less.

The slider 41 may be fixable on the earphone cords and may be connected to the guide unit 39 by a soft sleeve 42 with the earphone cords disposed inside. The earphone cords may have a bulge between the corresponding electromechanical unit and the slider 41 so as to limit movement of the slider 41 along the earphone cords without impeding movement of the earphone cords inside the guide unit 39 and the Bowden cables.

Figure 17:
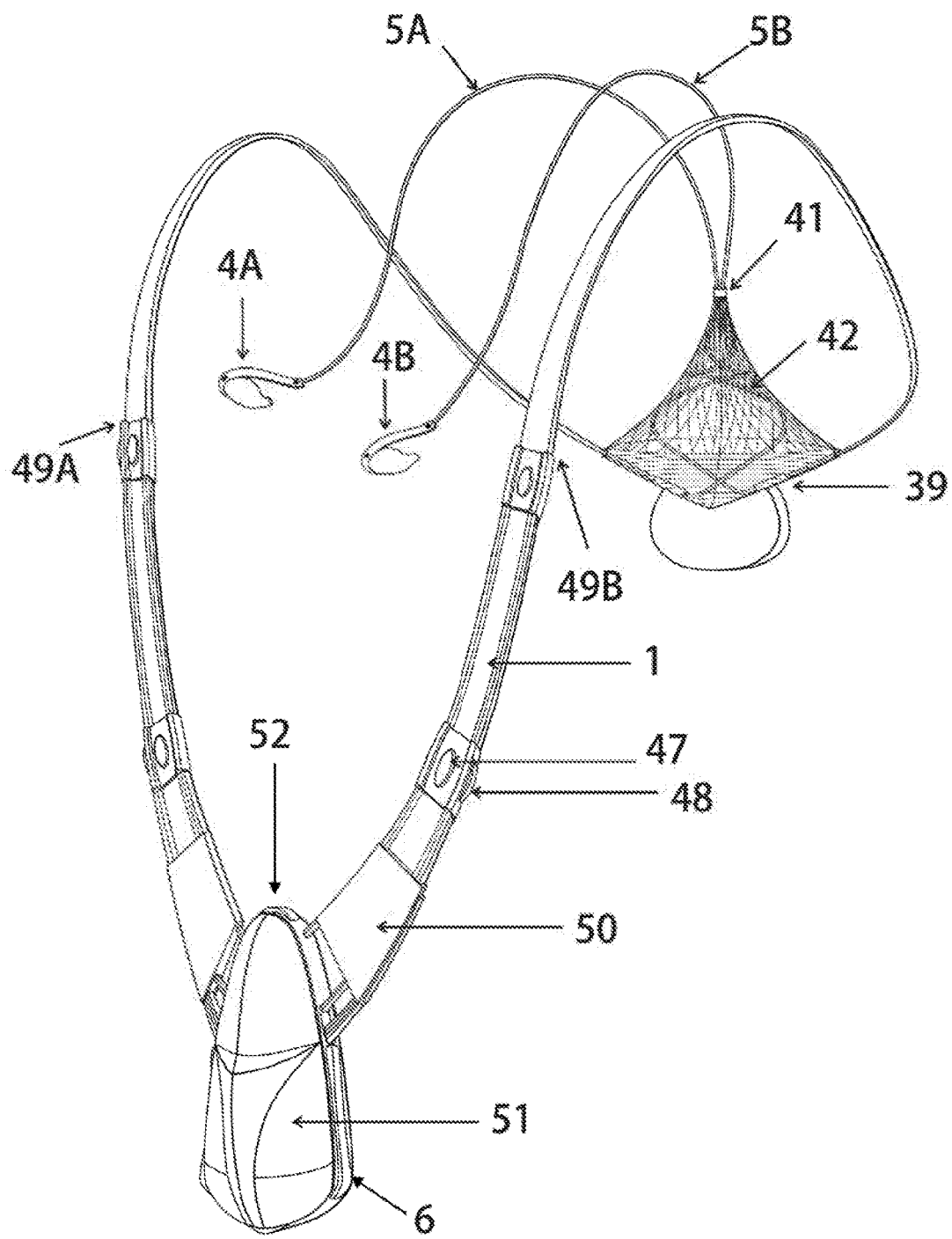
FIG. 17 is a general view of a wearable device according to the invention, provided as a multifunctional portable device.

An embodiment of the modular device having a guide unit, a slider and a soft sleeve is shown in FIG. 17. The neck loop 1 may include functional units 50 and 51 and the neck loop may be configured to prevent twisting the units. When in a non-operational position, the earphones 4A, 4B are parked on parking spots 49A, 49B. The soft sleeve 42 may be provided in a form of a grid spring.

When the earphones 4A, 4B are moved to an operational position, the soft sleeve 42 is straightened out, as a result, the slider 41 is fixed on the suboccipital portion of the user's head, thus appropriately arranging the headphone cords 5A and 5B. The wearable device may additionally include locks for opening the neck loop i.e., for disconnecting parts of the loop so as to make the loop open. The control means may be disposed on the loop (buttons 47, 48) or on the units (buttons 6, 52). The unit 51 may be designed as a medallion and may provide communications in a user's Personal Area Network (PAN) between a mobile phone, a player, a radio station, etc., via a wireless transceiver of electromagnetic signals with license-exempt parameters, for example, Bluetooth, Kleer, ZigBee, AirPlay, Ultra-Wide Band, Piconet, etc. In some embodiments, any of the units 50, 51 may be a phone or a smartphone, a radio station, a player, a radio, a Wi-Fi or GPS receiver, an electronic key or a data storage medium.

In some embodiments, the functional units of the device may be provided in a form of replaceable modules, which may be replaced both in production by the manufacturer and in operation by the user. Such modular configuration of the wearable communication device provides possibility of flexible functional adjustment and timely upgrade according to engineering progress in the art.

The units may be configured to be electrically and/or mechanically connected to additional electronic units or external devices.

If necessary (e.g., when the user has to answer an incoming call or listen to an incoming message), any of the earphones may be readily transitioned from a non-operation position to an operational position and the device may be used in a monophonic mode.

Thus, the device described herein may be configured as a constantly worn device, wherein the device has a bigger size and thus provides more room for hardware (like microphones, digital signal processors, data storage memory, sensors, radio transceivers, antennas, more powerful power source, etc.), still being anatomically comfortable, ergonomic and user-friendly while wearing.

The earphones of a special shape are designed for parking on the units disposed on the user's body, so the device does not have to be taken off when unused, and may be worn in a non-operational position, meanwhile the earphones are parked very compactly so they do not catch on the clothes and never bother the user.

The wearable device engages the user's body very close and in some embodiments, it has a vibration ring (a vibro-call), where the vibration ring may be configured to different vibration patterns according to events, so even when the acoustic ring is off, a call or a message may be successfully received; moreover, different events may be identified by the different vibration patterns with no need for any actions by the user.

The wearable modular device in a form of an open loop or a closed loop may be controlled directly through the user's clothes, with no necessity of pulling it from a pocket or a bag or drawing it from under the clothes.

When the wearable modular device is taken off, it may be easily folded (i.e., reduced in size owing to flexible members (e.g., tapes, wires or cords) placed between the rigid members, meanwhile avoiding mesh of the cords.

The additional advantage of the wearable device is the ability to place antennas of a Bluetooth or another wireless unit in the neck loop, preferably according to the Vedensky expression, at the level of user's shoulders to provide better conditions for reception and transmission of radio signals.

The wearable device may also include gyroscopes, accelerometers, magnetometers or other position sensors optionally in addition to a GPS or similar receiver, to assist in navigation with voice prompts. If the sensors are positioned on earphone arms or bails, or in the earphones themselves, the navigation system housed in the wearable device will be able to determine rotation and/or tilt of the user's head.

In some embodiments, the wearable device may be controlled without taking it from under clothes or pulling a phone from a pocket, because the buttons located under clothes may be pressed from outside, though clothes, or by giving voice commands without any need of hand manipulations at all. However, it should be kept in mind that to activate voice commands, a button on the wearable device still has to be pressed, which increases the importance of the tactile interface used in the wearable device.

With a constantly worn, but nearly invisible, device, the user may stay in touch, listen to the music, podcasts, and receive current voice information without impairing the user's appearance and differentiating oneself from others.

Use of the wearable device reduces the effect of electromagnetic radiation from the phone on the brain.

Direct contact between the device and the user's skin allows positioning on the wearable device sensors for monitoring parameters of user's health, such as temperature, blood pressure, sugar, alcohol in skin secretions, etc. Monitoring galvanic skin response provides control of the sympathetic nervous system, which allows using the wearable device as a part of a biotelemetry system for medical diagnostics or for safety purposes like sleep control of drivers.

The wearable device may be used not only as an option for connecting to a mobile phone or used itself as a mobile phone, but also may be used as a component of a wearable mobile system with hardware distributed over several devices carried by a person. For example, some hardware and a battery may be accommodated in a man's trouser belt, while the wired connection to the wearable device may be implemented by a cord, which is positioned under clothes along the user's spine on the back. The wearable device itself may be a mobile phone or smartphone, while a separately worn screen/keyboard unit may be used as a wireless interface to the mobile phone or smartphone.

With further development of technologies, that enhances capabilities of voice communications between human and computer, as well as with wide spread of 3G and 4G communication, the advantages of the wearable device become even more obvious. In particular, it facilitates implementation of improved quality communications with the ability to speak and listen to a counterpart on a phone using HD-voice telephony and stereo mode; GPS navigation without visual inspection of the map, but only with voice commands sent to the user's earphones; development of new voiceover Internet and web surfing services without any need of a screen and/or a mouse, but only using a voice interface and or gesture control. When a user performs any actions, functions or operations involving both hands, the wearable device allows being constantly in touch or online without focusing on keeping the phone, but using voice prompts of the operator or computer.

Having thus described a preferred embodiment, it should be apparent to those skilled in the art that certain advantages of the described method and system have been achieved. It should also be appreciated that various modifications, adaptations, and alternative embodiments thereof may be made within the scope and spirit of the present invention. The invention is further defined by the following claims.

What is claimed is:
1. A wearable electronic device comprising:
a neck loop configured to be worn around a user's neck and including two electromechanical units;
an electrical connector on the neck loop;
two in-ear earphones;
two cords, one end of each of the cords being connected to one of the earphones and the other end being connected to the electrical connector, wherein the cords are also mechanically connected to the neck loop close to each other,
wherein the electromechanical units are mechanically connected to the neck loop so as to prevent twist of the electromechanical units and to ensure that one of the electromechanical units is on the left side of the user's chest, and the other electromechanical unit is on the right side of the user's chest, wherein at least one of the electromechanical units includes a control key and comprises a substantially flat shell with at least three narrow facets, wherein two of the narrow facets are adjacent to each other and substantially perpendicular to the user's body surface, when the telecommunication device is worn by the user, wherein a press surface of the control key is disposed at an angle of 60 to 90 degrees relative to the user's body plane, close to a border between the two adjacent narrow facets, and the third narrow facet is at least partially opposed to the press surface of the control key.

2. The device of claim 1, wherein at least one of two cords comprises an attachment disposed on the cord at a distance of 13 cm or less from a point of connection between the cord and the neck loop.

3. The device of claim 2, wherein the attachment is configured to join the cords together.

4. The device of claim 2, wherein the attachment is configured to slide along the cords.

5. The device of claim 2, wherein the attachment further comprises an additional control key.

6. The device of claim 2, wherein the attachment further comprises a microphone.

7. The device of claim 1, wherein the neck loop is U-shaped.

8. The device of claim 1, wherein one of the electromechanical units comprises two recesses, each of which is configured to receive one of the earphones, and is equipped with a latched lid, and the electromechanical unit comprises at least one button configured to open at least one of the lids.

9. The device of claim 1, further comprising a head mounted display in a form of glasses connected to the neck loop by a cord, wherein the in-ear earphones are connected to the head mounted display.

10. The device of claim 1, wherein the neck loop and at least one of the electromechanical units are configured to adjust the neck loop length by arranging an excess portion of the neck loop inside the electromechanical unit.

11. The device of claim 1, wherein the substantially flat shell is polyhedron-shaped.

12. The device of claim 1, wherein at least one of the substantially polyhedron-shaped flat shells comprises at least one curvilinear convex surface.

13. A wearable electronic device comprising:
a neck loop configured to be worn on a user's neck and including two electromechanical units;
two in-ear earphones;
two earphone cords;
wherein each electromechanical unit has an earphone cord winding mechanism including
(i) a spool for winding the earphone cord;
(ii) a double drive mechanism including an electric motor, a reducer, and a spiral spring;
(iii) an engagement mechanism for ensuring engagement between the double drive mechanism and the spool; and
(iv) a lock mechanism for locking and unlocking rotation of the spool, wherein at least one of the electromechanical units comprises a motor control key for controlling the electric motor and the lock mechanism, wherein one end of each of the cords is connected to one of the earphones and the other end is connected to one of the spools, wherein the electromechanical units are mechanically connected to each other so as to prevent twist of the electromechanical units, and the electromechanical units are mechanically connected to the neck loop so as to ensure that one of the electromechanical units is positioned on the left side of the user's chest, and the other electromechanical unit is positioned on the right side of the user's chest.

14. The device of claim 13, wherein the engagement mechanism comprises a floating pinion.

15. The device of claim 14, wherein the engagement mechanism comprises a pulling solenoid for moving the floating pinion so as to ensure engagement between the drive mechanism and the spool.

16. The device of claim 13, wherein the lock mechanism comprises a ratchet mechanism and a ratchet control mechanism.

17. The device of claim 16, wherein the ratchet mechanism is configured to avoid unintentional winding the earphone cord and the ratchet control mechanism is configured to deactivate the ratchet mechanism, when the electric motor is activated.

18. The device of claim 13, further comprising at least two Bowden cables, at least one guide unit, and at least one slider attached to the earphone cords between the earphones and the guide unit, wherein the guide unit is fixed on the neck loop by the Bowden cables between the electromechanical units, and is positioned on the dorsal surface of the user's neck, wherein the earphone cords are movably positioned inside the Bowden cables, wherein the slider is configured to move along the earphone cords so that a distance between the slider and the guide unit is 13 cm or less, wherein a weight of the guide unit is less than a total weight of the electromechanical units.

19. The device of claim 18, wherein the slider is fixable on the earphone cords.

20. The device of claim 18, wherein the slider is connected to the guide unit by a soft sleeve, wherein the earphone cords are inside the soft sleeve.

21. The device of claim 18, wherein at least one of the earphone cords comprises a bulge between the corresponding electromechanical unit and the slider so as to limit movement of the slider along the earphone cords without impeding movement of the earphone cords inside the guide unit and the two Bowden cables.

* * * * *